United States Patent [19]

Heldt

[11] 4,101,198

[45] Jul. 18, 1978

[54] FIBER OPTIC CONNECTOR WITH SPLIT FERRULE ASSEMBLY

[75] Inventor: Earl R. Heldt, Monta Vista, Calif.

[73] Assignee: Hewlett-Packard Company, Palo Alto, Calif.

[21] Appl. No.: 698,392

[22] Filed: Jun. 21, 1976

[51] Int. Cl.² ............................................. G02B 5/14
[52] U.S. Cl. ............................ 350/96.20; 350/96.21
[58] Field of Search ..................................... 350/96 C

[56] References Cited

U.S. PATENT DOCUMENTS

| | | | |
|---|---|---|---|
| 3,457,000 | 7/1969 | Genahr | 350/96 C |
| 3,999,837 | 12/1976 | Bowen et al. | 350/96 C |

FOREIGN PATENT DOCUMENTS

| | | | |
|---|---|---|---|
| 2,273,289 | 12/1975 | France | 350/96 C |
| 2,237,445 | 2/1974 | Fed. Rep. of Germany | 350/96 C |
| 2,529,352 | 1/1976 | Fed. Rep. of Germany | 350/96 C |

*Primary Examiner*—John K. Corbin
*Assistant Examiner*—Rolf Hille
*Attorney, Agent, or Firm*—F. D. LaRiviere

[57] ABSTRACT

The fiber optic connector described herein comprises a three-piece ferrule suitable for very small optical fibers, a boot and a shoulder nut for coupling with outside-threaded split sleeve, and provides closer concentricity tolerances and low-loss transmission of light from the end of one fiber to the end of another.

7 Claims, 9 Drawing Figures

FIBER OPTIC CONNECTOR WITH SPLIT FERRULE ASSEMBLY

BACKGROUND AND SUMMARY OF THE INVENTION

The efficiency with which light is transmitted from the end of one optical fiber to another is directly dependent upon, among other things, the concentric alignment of the fiber ends with one another and the medium, dirt or other light dispersive materials which come between the ends of the fiber and through which light must be transmitted. In addition, preparation of fiber ends is important. See for example, "Low Loss Splicing and Connection of Optical Waveguide Cables" by Robert M. Hawk and Frank L. Thiel, SPIE, Vol. 63 (1975) and "A Fiber-Optic-Cable Connector" by C. M. Miller, The Bell System Technical Journal, November 1975.

Prior art fiber optic connectors are generally designed such that fibers slide into a tube-like receiver, abutting end-to-end somewhere near the middle therein. In these designs, fibers tend to push dirt ahead at the fiber end causing interference. To clean that dirt out of a small aperture is very difficult. In addition, fiber ends may be damaged by the dirt or during the cleaning process, or they may fracture when they contact one another at the center of the tube.

The present invention achieves high tolerance concentricity for fibers as small as 0.002 inches O.D. by utilizing two half-shells having milled or broached flat surfaces and small radius for retaining the fiber. The half-shells are pressfit into a retainer sleeve to form the ferrule assembly. Close concentricity tolerances of inside and outside diameters are held and can be adjusted by an adjustable broach blade.

To join the ferrule to the optical fiber, fiber jacket is stripped away from the fiber, the fiber end is cleaved square and inserted between the two half-shells with the end of the fiber flush with ends of the half-shells which are then retained by the sleeve. After the ferrule and fiber have been assembled, the rear portion of the retainer sleeve of the ferrule is crimped to the jacket. The connector of the two fibers to be connected, each of which include a boot and shoulder nut, is then inserted into each end of a split, outside-threaded sleeve and retained therein by the shoulder nuts.

The connector of this invention provides better alignment of fiber-to-fiber ends for maximum light transmission. The closer two fiber ends can be aligned on their common centerline, the less light or power is lost. The connector can be assembled and disassembled many times with no injury to the fiber, since the fiber end is completely protected by the ferrule. The fiber end can be cleaned and inspected conveniently without removing the fiber from the ferrule since the fiber end is visible at interface end of the ferrule. Ferrule concentricity is controlled by machining identical halves which are assembled by interference fit into the retainer sleeve. The sleeve can be any size and shape to accept various cable jackets. Since the small I.D. for retaining the fiber is formed by broaching two halves of the ferrule half-shells, the problems of drilling very small holes, i.e., the near impossibility of drilling truly round holes of very small diameters, are not encountered.

DESCRIPTION OF THE PREFERRED EMBODIMENT

Figure 1:
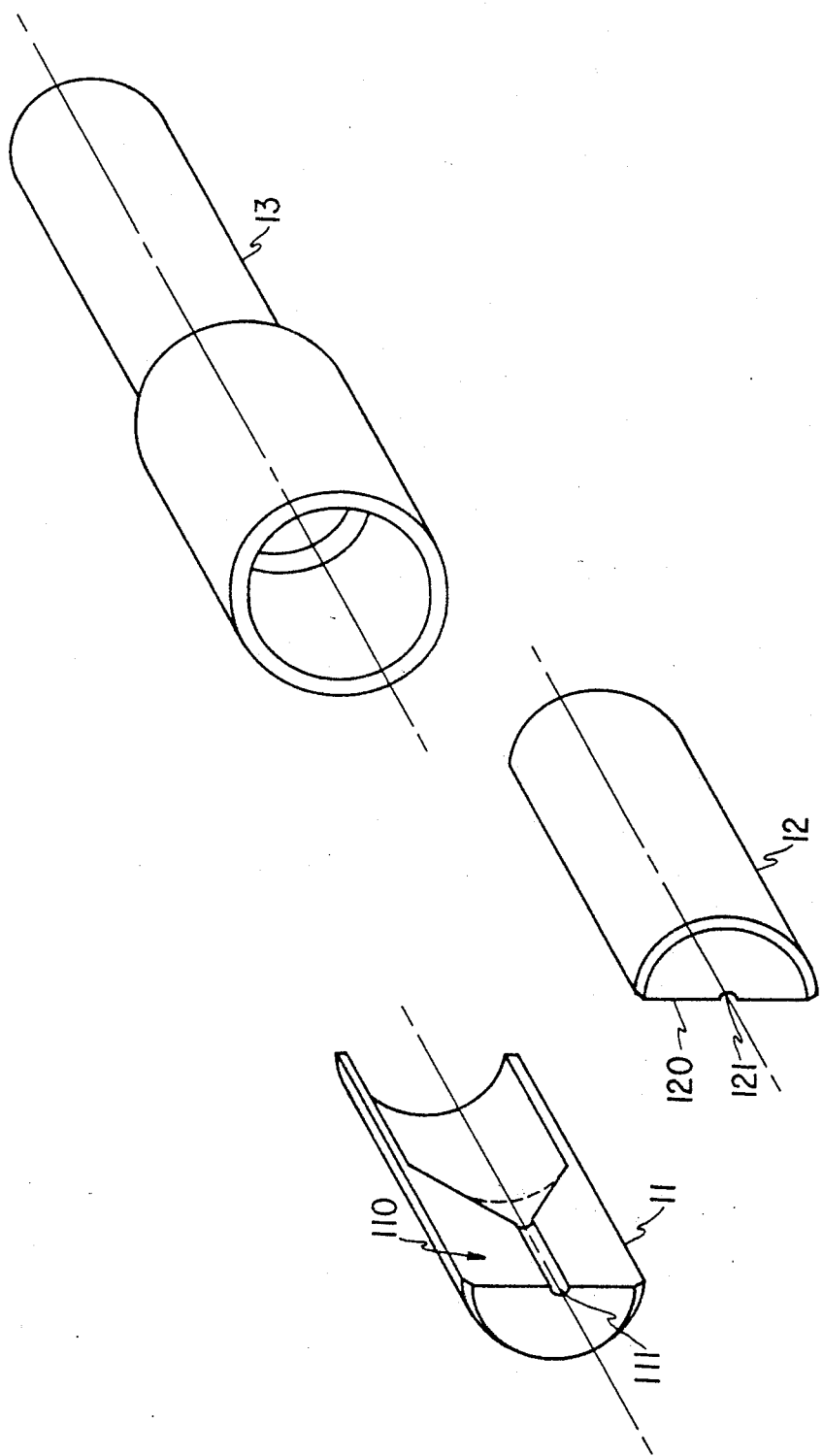
FIG. 1 is a perspective view of the three pieces of a connector ferrule constructed according to one embodiment of the present invention.
Figure 2:
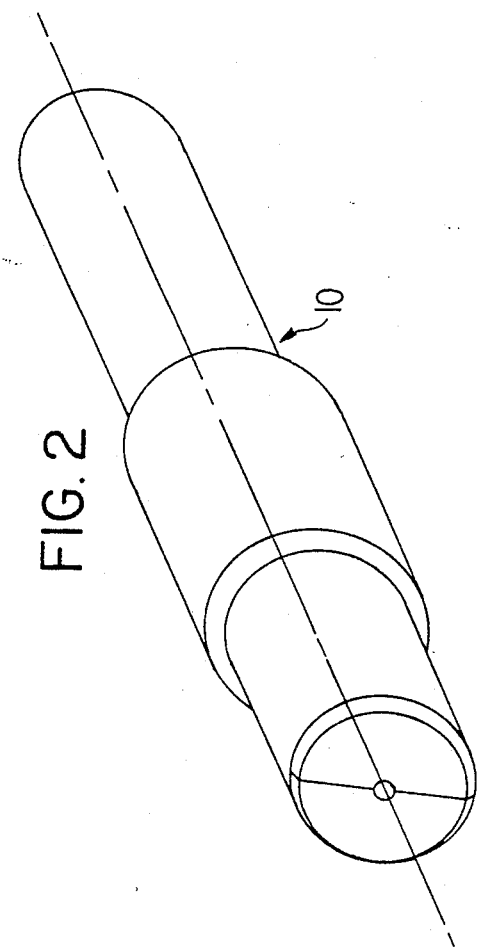
FIG. 2 is a perspective view of the assembled ferrule of FIG. 1.

Referring to FIGS. 1 and 2, ferrule 10 comprises half-shells 11 and 12, having flat faces 110 and 120, respectively, and coaxially aligned grooves 111 and 121, respectively, and retainer sleeve 103. When assembled flatface to flat-face, half-shells 11 and 12 form a hollowed cylinder having large inside diameter bore at one end, suitable for accepting the jacketed optical fiber, leading to a small, substantially uniform diameter bore at the other end for accepting the optical fiber itself. A tapered diameter is used for the transition between large and small inside diameters in the preferred embodiment. Thus, the assembled half-shells of the preferred embodiment form a conical transition portion of inside diamter of the ferrule.

Retainer sleeve is cylindrical, having a large inside diameter at one end to retain the assembled half-shells. The outside diameter of the assembled half-shells is slightly greater than the inside diameter of sleeve 13 to provide interference fit. Sleeve 13 has a smaller inside diameter at the other end, through which the jacketed optical fiber fits to terminate within the ferrule. Later, the smaller diameter portion of sleeve 13 is crimped to grip a jacketed portion of the optical fiber. However, referring to FIG. 2, the assembly of half-shells 11 and 12 of ferrule 10 are not crimped to grip the optical fiber itself, since such gripping tends to damage the outside surface of the fiber which deleteriously affects its light transmitting characteristics.

Figure 3:
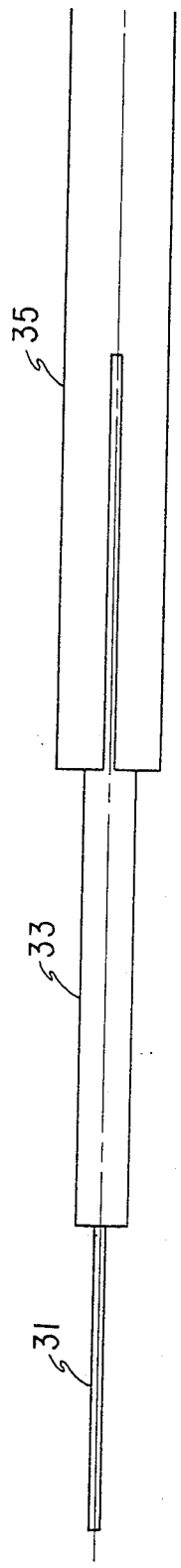
FIG. 3 is a side view of the optical fiber prepared for assembly with the one embodiment of a connector according to the present invention.
Figure 4:
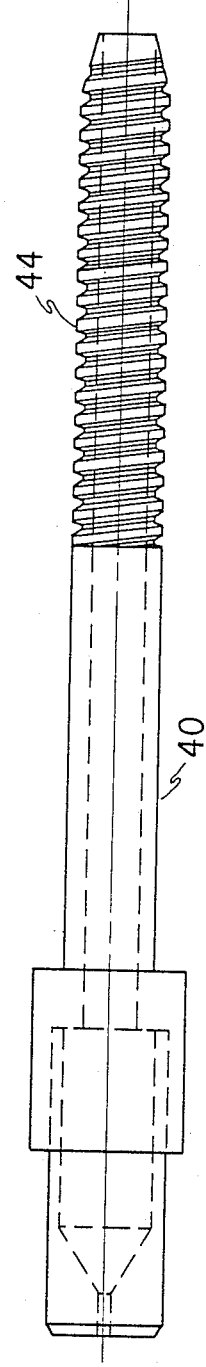
FIG. 4 is a side view of an assembled ferrule according to another embodiment of the present invention.
Figure 5:
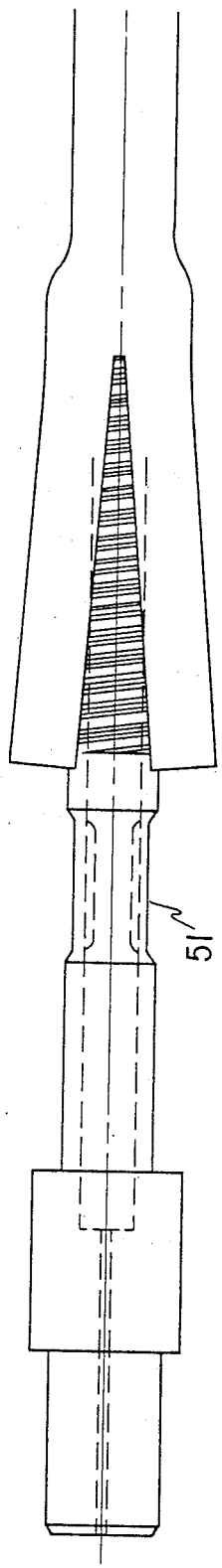
FIG. 5 is a side view of the ferrule of FIG. 4 partially assembled with the cable of FIG. 3.

Referring now to FIG. 3, a typical fiber optic cable comprises an optical fiber 31, jacket 33 and cover 35. That fiber is prepared for assembly with a connector according to the present invention by trimming cover 35 and jacket 33 to expose approximately ¼ inch of optical fiber, the end of which is cleaved square, by trimming additional cover to expose approximately ⅜ inch of jacketed fiber, and longitudinally slitting remaining cover approximately .3 inch. Ferrule 40, as shown assembled in FIG. 4, is different from ferrule 10 in that the smaller diameter portion of its retainer sleeve for retaining the jacketed optical fiber is extended and includes an outside threaded portion 44 for gripping the inside diameter of cover 35 which has been slit, in cooperation with boot 61 as shown in FIGS. 3 and 5. The cable of FIG. 3 is inserted into ferrule 40 and the jacketed portion thereof is non-slidably retained in ferrule 40 by crimp 51.

Figure 8B:
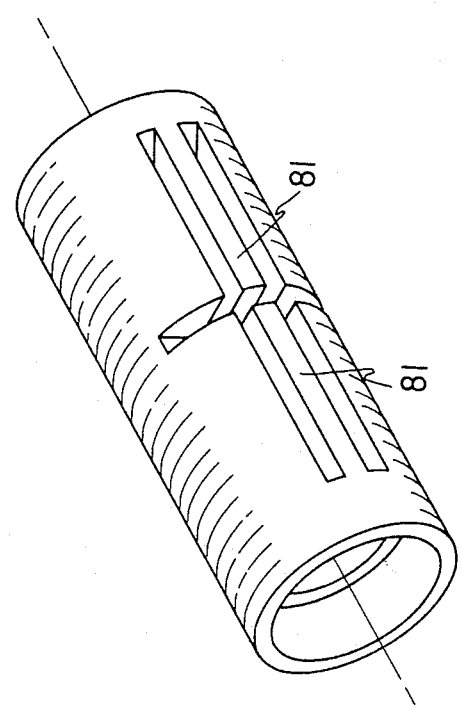
FIG. 8b is a perspective view of another embodiment of outside-threaded split sleeve for coupling to connectors shown in FIG. 6.
Figure 8A:
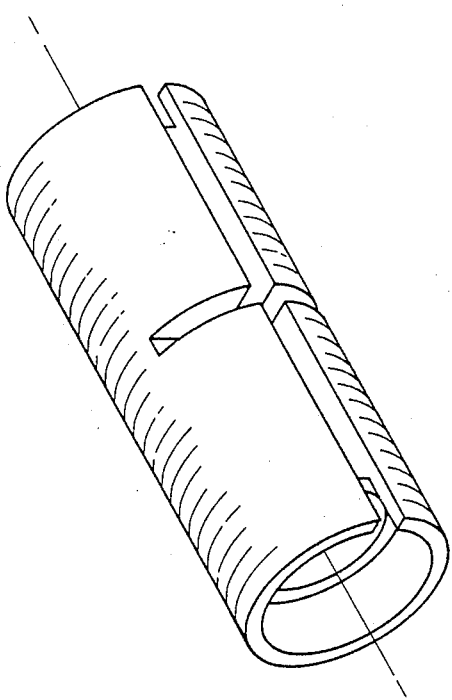
FIG. 8a is a perspective view of one embodiment of outside-threaded split sleeve for coupling to connectors shown in FIG. 6.
Figure 7:
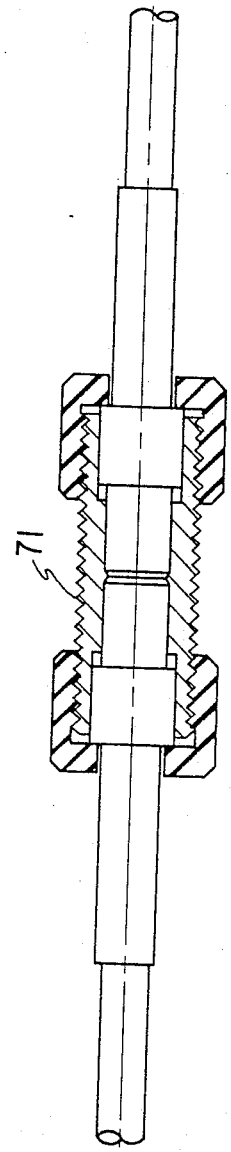
FIG. 7 is a side view of two optical fibers connected with the connector of FIG. 6.
Figure 6:
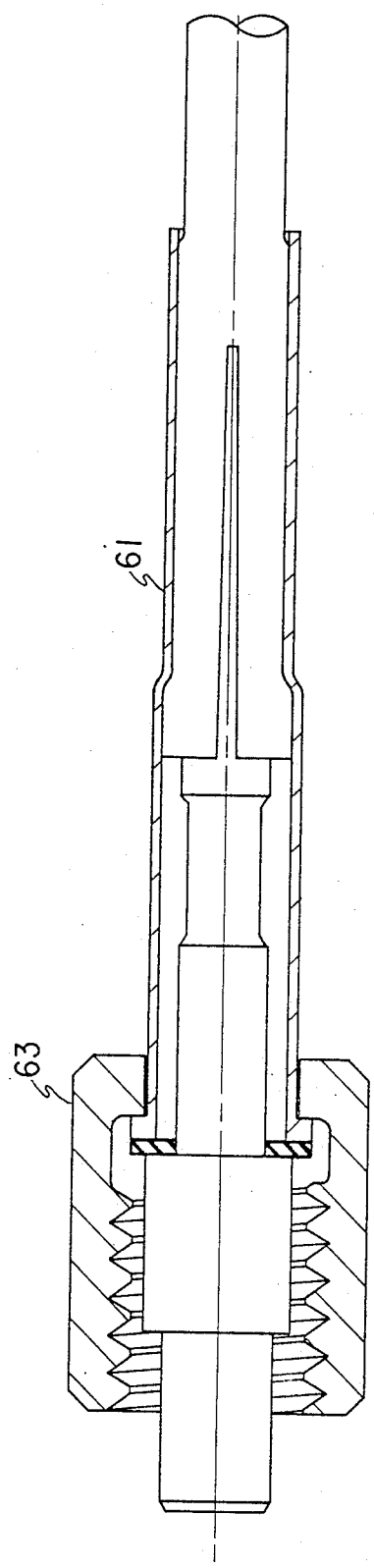
FIG. 6 is a side view of a connector according to the present invention fully assembled with the cable of FIG. 3 and the ferrule of FIG. 4.

The fully assembled connector of FIG. 6 includes boot 61 and shoulder nut 63. A similarly assembled connector on the end of another fiber optic cable is then connected to the fiber connector of FIG. 6 via outside threaded sleeve 71. Sleeve 71 can be formed as shown in FIGS. 8a and 8b to assure repeatable, snug-fit, axial alignment of the ferrules containing the fibers. The configuration of sleeve 71 shown in FIG. 8a applies force to the connector ferrules orthogonal to the longitudinal axis of the ferrules around the entire circumference of the sleeve. The configuration of sleeve 71 in FIG. 8b applies force to the ferrules inserted therein orthogonal to the longitudinal axis of the ferrules at fingers 81.

I claim:

1. A connector for end-to-end coupling of an individual optical fiber cable to another, each cable having an optical fiber, a fiber jacket and a cover, said connector comprising:

a ferrule for retaining the optical fiber and fiber jacket;

boot means for maintaining the cover in gripping relationship with the ferrule; and coupling means for coupling the ferrule to another ferrule;

said ferrule including a retainer sleeve and two half-shells, each of said half-shells having a flat face formed with a coaxially aligned groove to provide a bore of substantially uniform diameter for slidably retaining the optical fiber when mounted in the retainer sleeve.

2. A connector as in claim 1 wherein the assembly of half-shells form a cylinder having substantially uniform outside diameter, a large inside diameter at one end to retain a jacketed portion of the optical fiber, a small inside diameter at the other end to retain the optical fiber and a transition portion of inside diameter.

3. A connector as in claim 2 wherein the transition portion of inside diameter of the ferrule is tapered.

4. A connector as in claim 3 wherein the transition portion of inside diameter of the ferrule is conical.

5. A connector as in claim 1 further including a connector sleeve for coupling with the coupling means and for receiving a second connector.

6. A connector as in claim 1 wherein the retainer sleeve includes an outside threaded portion for gripping the inside surface of the cover in cooperation with the boot means.

7. A connector as in claim 1 wherein a portion of the large diameter of the ferrule is crimped to grip the jacketed portion of the optical fiber contained therein.

* * * * *